(12) United States Patent
Sivasankaran et al.

(10) Patent No.: US 10,479,865 B2
(45) Date of Patent: Nov. 19, 2019

(54) PROCESS FOR THE PREPARATION OF SEVELAMER CARBONATE

(71) Applicant: Strides Shasun Limited, Chennai (IN)

(72) Inventors: Narayanan Sivasankaran, Ammapet (IN); Iyappan Murugan, Chennai (IN); Karikalan Thangaraju, Thottiyam (IN); Iyyanar Kuppusamy, Tindivanam (IN); Uttam Kumar Ray, Chennai (IN); Tangirala Vittal, Chennai (IN)

(73) Assignee: Strides Shasun Limited, Chennai (IN)

( * ) Notice: Subject to any disclaimer, the term of this patent is extended or adjusted under 35 U.S.C. 154(b) by 84 days.

(21) Appl. No.: 15/903,510

(22) Filed: Feb. 23, 2018

(65) Prior Publication Data
US 2019/0127524 A1   May 2, 2019

(30) Foreign Application Priority Data

Nov. 1, 2017  (IN) .......................... 2101741038959

(51) Int. Cl.
*C08F 26/02* (2006.01)
*C08G 73/02* (2006.01)
*C08J 3/075* (2006.01)
*B01J 13/00* (2006.01)

(52) U.S. Cl.
CPC ........ *C08G 73/022* (2013.01); *B01J 13/0056* (2013.01); *B01J 13/0069* (2013.01); *C08J 3/075* (2013.01); *B01J 2219/00177* (2013.01); *C08G 2220/00* (2013.01)

(58) Field of Classification Search
CPC .......... C08F 8/44; C08F 26/02; C08F 126/02; C08F 2810/20; C08G 73/022; B01J 2219/00177

See application file for complete search history.

(56) References Cited

U.S. PATENT DOCUMENTS

| 5,496,545 | A | 3/1996 | Holmes-Farley et al. |
| 5,667,775 | A * | 9/1997 | Holmes-Farley .... A61K 31/662 424/78.11 |
| 6,083,495 | A | 7/2000 | Holmes-Farley et al. |
| 6,509,013 | B1 | 1/2003 | Holmes-Farley et al. |
| 7,105,631 | B2 * | 9/2006 | Stanek ................... C08F 6/008 504/345 |
| 2010/0331516 | A1 | 12/2010 | Sathe et al. |
| 2012/0088886 | A1 * | 4/2012 | Burde ...................... C08F 8/00 525/359.2 |
| 2012/0101234 | A1 * | 4/2012 | Villani ...................... C08J 3/24 525/293 |
| 2015/0080532 | A1 * | 3/2015 | Patel ........................ C08F 8/02 525/115 |
| 2016/0177019 | A1 * | 6/2016 | Dhal ..................... C08F 226/04 525/203 |

FOREIGN PATENT DOCUMENTS

| IN | 1893MUM2006 | 11/2006 | |
| WO | 2011099038 A2 | 8/2011 | |
| WO | WO-2011099038 A2 * | 8/2011 | ............... C08F 8/00 |

* cited by examiner

*Primary Examiner* — Robert C Boyle
(74) *Attorney, Agent, or Firm* — The Webb Law Firm

(57) ABSTRACT

The present invention relates to a process for the preparation of Sevelamer carbonate from polyallylamine hydrochloride.

18 Claims, No Drawings

PROCESS FOR THE PREPARATION OF SEVELAMER CARBONATE

CROSS-REFERENCE TO RELATED APPLICATION

This application claims priority to Indian Patent Application No. 201741038959 filed Nov. 1, 2017, the disclosure of which is hereby incorporated in its entirety by reference.

FIELD OF THE INVENTION

The present invention relates to a process for the preparation of Sevelamer carbonate from polyallylamine hydrochloride.

BACKGROUND OF THE INVENTION

Sevelamer carbonate is an orally administrable polymeric amine that acts as phosphate binding polymer for removing phosphate from gastrointestinal tract. It is marketed under the trade name of Renvela in USA. It was developed as a pharmaceutical alternative to Sevelamer hydrochloride. Sevelamer carbonate is an anion exchange resin, with the same polymeric structure as Sevelamer hydrochloride, in which carbonate replaces chloride as the counterion. Sevelamer carbonate is chemically known as poly(allylamine-co-N,N'-diallyl-1,3-diamino-2-hydroxypropane) carbonate salt.

The processes for preparing Sevelamer hydrochloride involving the cross linking reaction of epichlorohydrin with partially neutralized polyallylamine at room temperature are disclosed in U.S. Pat. No. 6,509,013, U.S. Pat. No. 6,083,495, U.S. Pat. No. 5,496,545 and U.S. Pat. No. 5,667,775. The Sevelamer carbonate can be prepared from the Sevelamer hydrochloride by further treatment with suitable carbonate source.

The Indian Patent Application No. 1893/MUM/2006 discloses a process for the preparation of Sevelamer carbonate, wherein Sevelamer hydrochloride is first converted to Sevelamer free base, and this is followed by the treatment with carbonate source.

The US Patent Application No. 20100331516 discloses a process for the preparation of Sevelamer carbonate, wherein the starting reagent allylamine or polyallylamine is first interacted with a suitable carbonate source.

The US Patent Application No. 20120088886 discloses a process for preparation of Sevelamer carbonate which employs the reaction of polyallylamine hydrochloride with epichlorohydrin at the pH of about 10 to about 11.

The International Patent Publication No. WO2011099038 discloses a process for the preparation of a crosslinked poly(allylamine carbonate), wherein first the crosslinked polallylamine free base was prepared by reacting the polyallylamine base with a crosslinking agent; and this was followed by the isolation of crosslinked polyallylamine free base by increasing the pH and further reaction with carbon dioxide to obtain the crosslinked poly(allylamine carbonate).

Besides the availability of different methods for the preparation Sevelamer carbonate in state of the art, there is a need for an improved process for the preparation of Sevelamer carbonate that is economically significant.

SUMMARY OF THE INVENTION

The present invention provides a process for the preparation of Sevelamer carbonate comprising the steps of:

(a) contacting an aqueous alkaline solution of polyallylamine hydrochloride with epichlorohydrin at a pH of more than 12;
(b) maintaining the reaction mixture obtained in step (a) under stirring till the formation of gel;
(c) optionally washing the gel with water miscible solvent(s) and/or water;
(d) suspending the obtained gel in step (b) or step (c) in water;
(e) treating the suspension obtained in step (d) with carbon dioxide in water to obtain Sevelamer carbonate; and
(f) optionally washing the Sevelamer carbonate with water miscible solvent(s) and/or water.

DETAILED DESCRIPTION OF THE INVENTION

In one aspect of the present invention, there is provided a process for the preparation of Sevelamer carbonate; the said process comprising the steps of:

(a) contacting an aqueous alkaline solution of polyallylamine hydrochloride with epichlorohydrin at a pH of more than 12;
(b) maintaining the reaction mixture obtained in step (a) under stirring till the formation of gel;
(c) optionally washing the gel with water miscible solvent(s) and/or water;
(d) suspending the obtained gel in step (b) or step (c) in water;
(e) treating the suspension obtained in step (d) with carbon dioxide to obtain Sevelamer carbonate; and
(f) optionally washing the Sevelamer carbonate with water miscible solvent(s) and/or water.

The aqueous alkaline solution of polyallylamine hydrochloride may be prepared by the steps of: dissolving the polyallylamine hydrochloride in water to obtain an aqueous solution of polyallylamine hydrochloride; and adding a solution of alkali or alkaline earth metal hydroxides to the aqueous solution of polyallylamine hydrochloride. The alkali or alkaline earth metal hydroxides may be selected from the group comprising sodium hydroxide, potassium hydroxide, calcium hydroxide or magnesium hydroxide; preferably sodium hydroxide.

In one embodiment of the present invention, there is provided a process for the preparation of Sevelamer carbonate, wherein polyallylamine hydrochloride is reacted with epichlorohydrin at a pH of more than 12, preferably 12 to 14. In some embodiments of the invention, the polyallylamine hydrochloride is reacted with epichlorohydrin at pH of 13 to 14.

The epichlorohydrin employed in this invention is also commercially available.

The maintenance of the reaction mixture performed in step (b) of the present process may be carried out for some time, for example a few hours. The maintenance of the reaction mixture performed in step (b) of the present process may be carried out at temperature between 20° C. to 80° C., preferably 30° C. to 50° C. In some embodiments, the reaction mixture in step (b) is maintained for about 15 to 1 hours preferably 30 minutes.

The water-miscible solvents according to this invention are well known in the art and include, but are not intended to be limited to $C_1$-$C_4$ alcohol, dimethylformamide, tetrahydrofuran, dimethyl sulfoxide, acetonitrile; preferably $C_1$-$C_4$ alcohol and more preferably isopropanol.

In some embodiment of the present invention, the invented process further involves drying and milling of the obtained final product. The drying and milling process may be done by any methods familiar with a person skilled in the art, such as tray dryer, cone dryer, fluidized-bed dryer, Nauta dryer and granulator equipped with chopper and milling machines used are Fitz-mill, Turbo-mill, pin-mill and jet mill respectively.

In another embodiment of the present invention, the Sevelamer carbonate obtained may be further compressed by a compressing process such as pressing, extruding or rolling.

In some embodiments of the invention, there is provided a process for the preparation of Sevelamer carbonate comprising the steps of:
(a) contacting an aqueous alkaline solution of polyallylamine hydrochloride with epichlorohydrin at a pH of 13 to 14;
(b) maintaining the reaction mixture obtained in step (a) under stirring till the formation of gel;
(c) optionally washing the gel with isopropanol and water;
(d) suspending the obtained gel in step (b) or step (c) in water;
(e) treating the suspension obtained in step (d) with carbon dioxide in water to obtain Sevelamer carbonate; and
(f) optionally washing the Sevelamer carbonate with methanol and water.

The present invention is described by the following examples, which are for illustrative purpose only and should not be construed as to limit the scope of the invention in any manner.

EXAMPLES

Example-1

Preparation of Sevelamer Carbonate

Step (I): To an aqueous solution of polyallylamine hydrochloride (100 g of polyallylamine hydrochloride in 150 mL of water), sodium hydroxide solution (30% solution in water) was added till the pH of about 13 to 14 was obtained. Epichlorohydrin (9 g) was added to the alkaline aqueous solution of polyallylamine hydrochloride at 30° C. and stirred the reaction mass at the same temperature till gel formation. The formed gel was maintained for 1 hour at 30° C. and then washed with isopropanol (1000 mL) and water (1500 mL).

Step (II): The washed gel obtained in step (I) was suspended in water (2000 mL). Carbon dioxide gas was purged in the obtained solution till the pH of about 9 to 10 was obtained; and the reaction mass was further stirred for 3 hours at 30° C. to obtain the solid mass. The resultant solid was filtered, washed with water (1500 mL) and methanol (1000 mL) and dried. Yield: 50 g.

We claim:
1. A process for the preparation of Sevelamer carbonate, comprising:
(a) contacting an aqueous alkaline solution of polyallylamine hydrochloride with epichlorohydrin at a pH of more than 12;
(b) maintaining the reaction mixture obtained in step (a) under stirring until the formation of gel;
(c) optionally washing the gel with at least one of water miscible solvent(s) and water;
(d) suspending the obtained gel in step (b) or step (c) in water;
(e) treating the suspension obtained in step (d) with carbon dioxide in water to obtain Sevelamer carbonate; and
(f) optionally washing the Sevelamer carbonate with at least one of water miscible solvent(s) and water.

2. The process according to claim 1, wherein the aqueous alkaline solution of polyallylamine hydrochloride is prepared by dissolving the polyallylamine hydrochloride in water to obtain an aqueous solution of polyallylamine hydrochloride; the process further comprising treatment with a solution of alkali or alkaline earth metal hydroxides.

3. The process according to claim 2, wherein the alkali or alkaline earth metal hydroxides is selected from the group comprising: sodium hydroxide, potassium hydroxide, calcium hydroxide, and magnesium hydroxide.

4. The process according to claim 1, wherein the pH is in the range of 12 to 14.

5. The process according to claim 1, wherein the pH is in the range of 13 to 14.

6. The process according to claim 1, wherein the water miscible solvent in step (c) or step (f) is selected from the group comprising: $C_1$-$C_4$ alcohol, dimethylformamide, tetrahydrofuran, dimethyl sulfoxide, and acetonitrile.

7. The process according to claim 6, wherein the water miscible solvent in step (c) comprises isopropanol.

8. The process according to claim 6, wherein the water miscible solvent in step (f) comprises methanol.

9. A process for the preparation of Sevelamer carbonate, comprising:
(a) contacting an aqueous alkaline solution of polyallylamine hydrochloride with epichlorohydrin at a pH in the range of 13 to 14;
(b) maintaining the reaction mixture obtained in step (a) under stirring until the formation of gel;
(c) optionally washing the gel with isopropanol and water;
(d) suspending the obtained gel in step (b) or step (c) in water;
(e) treating the suspension obtained in step (d) with carbon dioxide in water to obtain Sevelamer carbonate; and
(f) optionally washing the Sevelamer carbonate with methanol and water.

10. The process according to any of the claim 1, wherein the reaction mixture in step (b) is maintained for about 30 minutes.

11. The process according to any of the claim 2, wherein the reaction mixture in step (b) is maintained for about 30 minutes.

12. The process according to any of the claim 3, wherein the reaction mixture in step (b) is maintained for about 30 minutes.

13. The process according to any of the claim 4, wherein the reaction mixture in step (b) is maintained for about 30 minutes.

14. The process according to any of the claim 5, wherein the reaction mixture in step (b) is maintained for about 30 minutes.

15. The process according to any of the claim 6, wherein the reaction mixture in step (b) is maintained for about 30 minutes.

16. The process according to any of the claim 7, wherein the reaction mixture in step (b) is maintained for about 30 minutes.

17. The process according to any of the claim 8, wherein the reaction mixture in step (b) is maintained for about 30 minutes.

18. The process according to any of the claim 9, wherein the reaction mixture in step (b) is maintained for about 30 minutes.

\* \* \* \* \*